Oct. 10, 1961     T. B. SORBIE     3,003,627
APPARATUS FOR DETECTING AND INSPECTING ARTICLES IN CONTAINERS
Filed Aug. 13, 1957     3 Sheets-Sheet 1
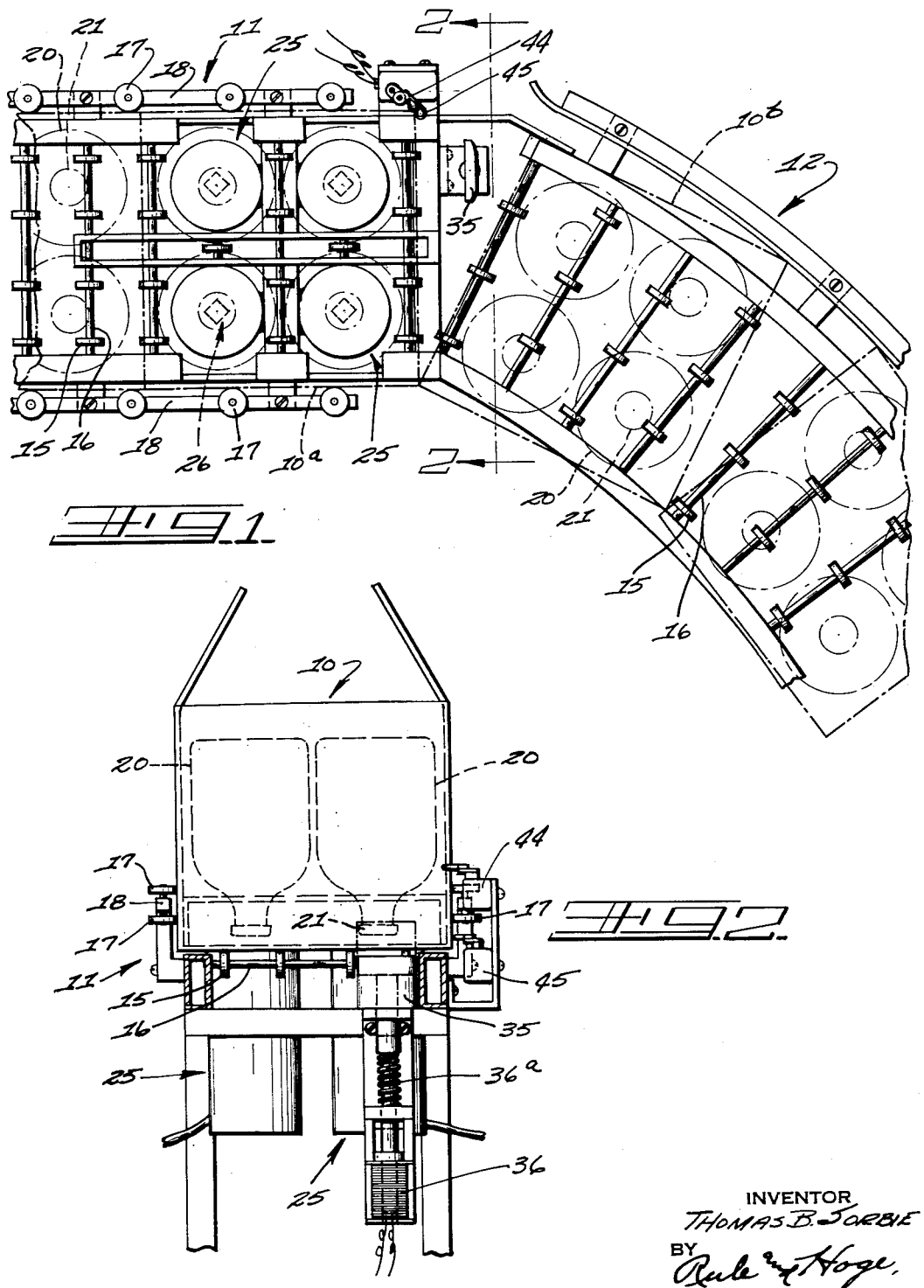
INVENTOR
THOMAS B. SORBIE
BY
ATTORNEYS

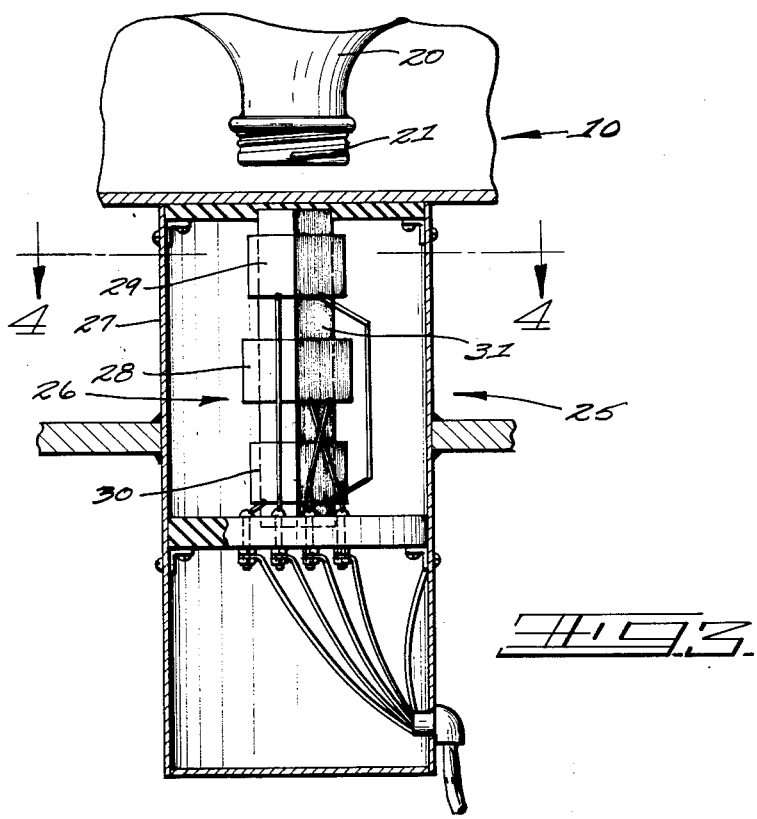
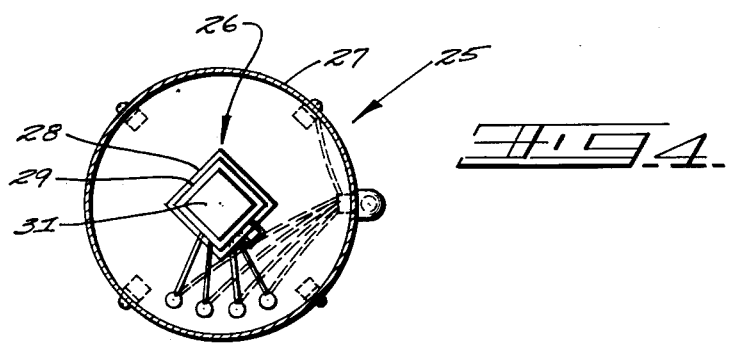

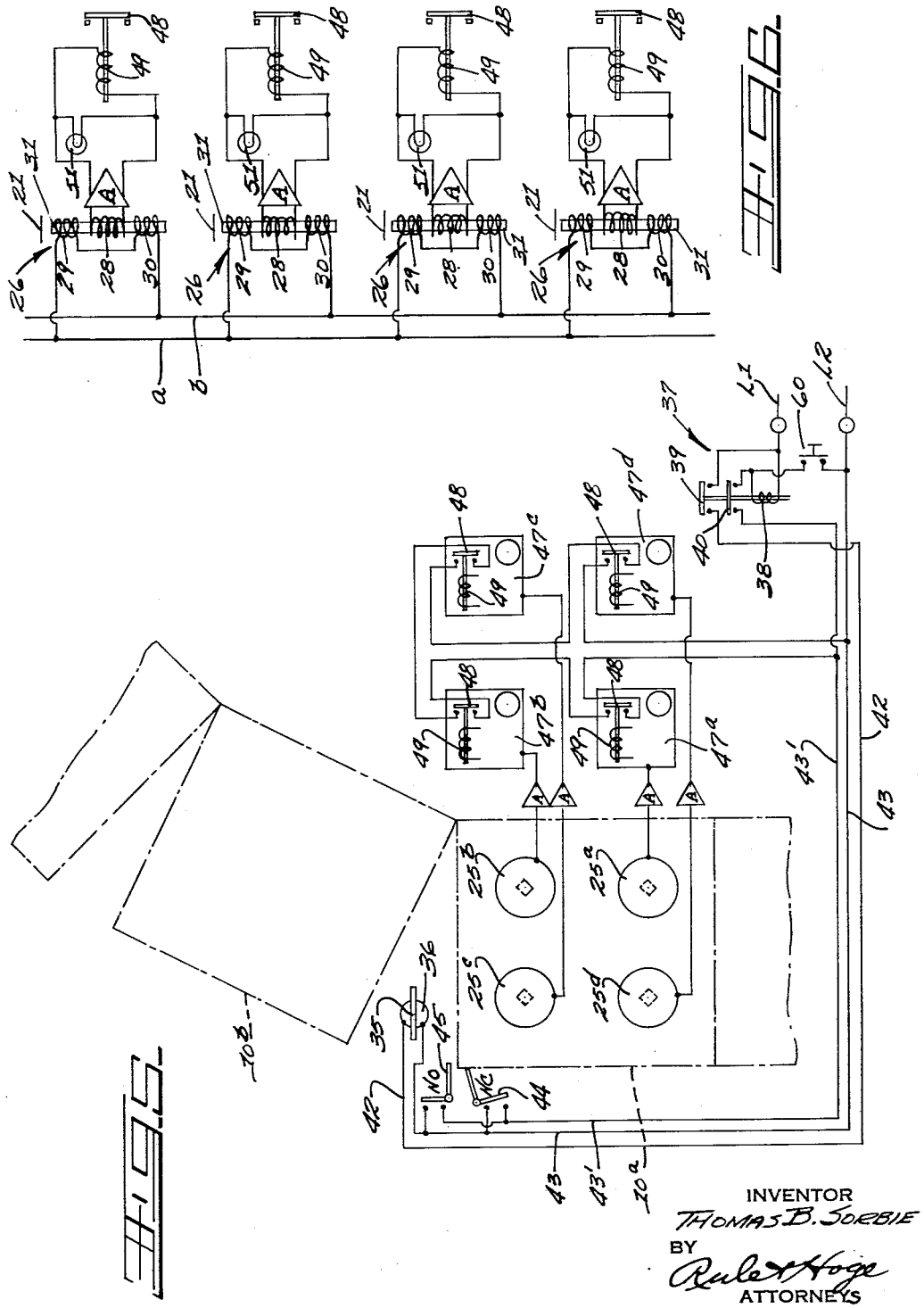

United States Patent Office 3,003,627
Patented Oct. 10, 1961

3,003,627
APPARATUS FOR DETECTING AND INSPECTING ARTICLES IN CONTAINERS
Thomas B. Sorbie, Toledo, Ohio, assignor to Owens-Illinois Glass Company, a corporation of Ohio
Filed Aug. 13, 1957, Ser. No. 677,876
12 Claims. (Cl. 209—71)

The present invention relates to apparatus for inspecting cartons, boxes, or other carriers for various articles and for detecting the presence or absence of individual articles placed within the carrier. The invention as herein illustrated comprises apparatus for inspecting cartons in which are packed bottles or other containers arranged with each container in a restricted area within the carton. The invention provides means for detecting the absence of any such container and also the absence of any individual closure cap from a container.

The invention in the form herein illustrated comprises a conveyor for cartons in which jars, bottles or other containers are packed in a prescribed order, the containers, having ferrous metal closure caps applied thereto. The containers may be either empty or filled with any desired commodity. The conveyor may be inclined, permitting the cartons to be carried by gravity along the conveyor and pass in succession through an inspecting or detecting station. Detecting devices, each comprising a differential transformer, and an amplifier are located at said station and are so positioned and arranged that the closure caps of iron or magnetic material pass directly over the transformers. If the articles packaged within the containers are in the prescribed order, with the closure caps on, the cartons are permitted to pass through the inspection station without interruption. If a container or a closure cap is missing, a stop gate is automatically moved into position to arrest the carton.

The precise nature of the invention will appear more fully hereinafter in connection with the following description of a preferred form of apparatus as illlustrated in the accompanying drawings:

FIG. 1 is a plan view of the conveyor mechanism;

FIG. 2 is a sectional elevation at the line 2—2 on FIG. 1, also showing a carton at the inspection station;

FIG. 3 is a part sectional elevation of a detector comprising a differential transformer;

FIG. 4 is a section at the line 4—4 on FIG. 3;

FIG. 5 is a wiring diagram of the electrical control system controlling the operation of the stope gate; and FIG. 6 is a wiring diagram of the differential transformer circuits.

Referring particularly to FIGS. 1 and 2, cartons 10 are carried in succession through an inspecting zone by a conveyor comprising a straight section 11 along which the cartons 10 may move forward in abutting relation to the position 10$^a$ at an inspecting station. A curved section 12 of the conveyor extends forward at an angle to the section 11 so that each carton is swung to the position 10$^b$ as it advances, thereby leaving a gap between adjoining cartons. This leaves room for the operation of a stop gate 35 as hereinafter described. The conveyor may be of the type known in the trade as a skate wheel conveyor. The conveyor is downwardly and forwardly inclined and comprises a multiplicity of rolls 15 mounted on shafts 16 and providing bottom support for the travelling cartons. The cartons are guided between side rails 18 carrying rolls 17. Each carton has packaged therein a plurality of containers 20, each container having a closure cap 21 of magnetic material. The cartons are placed on the conveyor with the containers therein bottom-side-up. As herein shown, each carton has four bottles or jars 20 therein arranged in a prescribed order with each bottle occupying one quarter of the carton.

Article locating and detecting devices, corresponding in number and arrangement to the number and position of the articles within a carton, are located at the inspection station. Each detecting device 25, as shown in FIGS. 3 and 4, comprises a transducer in the form of a differential transformer 26 mounted within a case 27. The transformer comprises primary coils 29 and 30, and a secondary coil 28, mounted on an iron core 31. The upper end of the transformer core is beneath and close to the path of the cartons passing thereover. When a carton reaches the inspecting station, the containers 20 with their metal caps 21 are directly over the transformers, each cap 21 being in close proximity to the transformer core. The primary coils 29 and 30 are wound or connected in opposite phase and balanced. When a carton is brought to the testing position with the metal caps 21 within the magnetic fields of the transformers, the balance is upset, thereby supplying voltage through the secondary coil. This voltage is fed to amplifiers A for operating relays as hereinafter described. When a detector 25 fails to operate, owing to the absence of a container 20 or container cap 21, a stop gate 35 is projected into position to arrest the carton. The stop gate 35 (FIGS. 1 and 2) is mounted for up-and-down movement and is normally held in its lowered, inoperative position by a solenoid 36. The gate is spring loaded by a spring 36$^a$ so that when the solenoid is de-energized the gate is moved up to arrest the oncoming carton.

The electrical control system for the stop gate 35 will now be described. Referring to FIG. 5, electric current is supplied from any suitable source through the mains L1 and L2. A relay 37, comprising a coil 38 and contact bars 39 and 40, controls a circuit for the gate magnet coil 36. This circuit extends from main L1 through contact bar 39, lead 42, gate solenoid 36 and return lead 43 to main L2. The solenoid 36 remains energized and holds the gate in its retracted position at all times while the relay 37 is energized. A circuit for the relay coil 38 extends from the main L1 through the coil 38, contact bar 40, and a lead 43'. The latter is connected to the return lead 43 and main L2 through each of three parallel circuits between the leads 43' and 43. These parallel circuits are, respectively, through switches 44 and 45, and a circuit through relays 47a, 47b, 47c, and 47d. This latter circuit extends through the relay contact bars 48 which are connected in series and each operated by a relay coil 49.

The relays 47a, 47b, 47c, and 47d are individual, respectively, to the transformers at positions 25a, 25b, 25c, and 25d. The relay coils 49 are energized by the amplifiers A which in turn are controlled by the signals from the differential transformers. As shown in FIG. 6, the primarys 29 and 30 of the transformers are connected across the mains a and b in an alternating current system. Each relay winding 49 is connected across the secondary coil of the corresponding transformer. The contact bars 48 are in open circuit position except when a carton is at the testing station and the metal caps on the containers within the magnetic fields of the transformers and induce a voltage in the secondary circuits of the transformers, thereby energizing the relays and closing the contact bars 48.

The switch 44 is opened by the carton in the testing zone when the closure caps of the containers within the magnetic fields of the transformers have effected the closing of the circuit through the relay contact bars 48. The switch 45, referred to as the normally open switch, is moved to closed position by each carton shortly after the switch 44 has been opened. The switch 45 is held closed until the carton has released the normally closed switch 44 and permitted it to close.

The operation may be summarized as follows:

The cartons 10 are moved along the conveyor by gravity and thereby carried in succession through the testing zone. The relay 37, being energized, maintains a circuit through the solenoid 36 of the stop gate 35, holding the latter down out of the path of the cartons. As a carton enters the testing zone so that the metal closure caps 21 are brought within the magnetic fields of the transformers, the relay coils 49 receive voltage and close the contact bars 48. This maintains the circuit for the relay coil 38 when the normally closed switch 44 is opened by the carton at the testing station. If all of the containers within the carton are in position and supplied with the metal closure caps, the relay 37 remains energized, thus maintaining a circuit for the stop gate solenoid 36. As the carton advances, it closes the normally open switch 45 before the solenoid coils 49 are deenergized so that the relay 37 continues to hold the circuit for the stop gate solenoid. The normally open switch 45 remains closed until the carton has released the normally closed switch 44, allowing the latter to again close. In this manner, a circuit is maintained for the gate solenoid throughout the test if the carton has its complete quota of capped containers, so that the carton passes uninterruptedly through the testing zone.

If a container 20 is missing or any of the containers is without a closure cap, then the associated relay coil 49 remains de-energized and the circuit through the contact bars 48 remains open. As a result, when the normally closed switch 44 is opened by the carton, the circuit for the relay coil 38 is broken and the relay 37 drops out, thus opening the circuit for the stop gate solenoid 36. The stop gate is then projected by the spring 36ᵃ in a stop position and arrests the carton which is under test. Signal lamps 51 connected in parallel with the relay coils 49 are lighted when these coils are energized, thereby indicating that the capped containers are in position in the carton. If any container or cap is missing the corresponding lamp will remain dark. A push button switch 60 in circuit with the relay winding 38 is operative to re-establish the stop gate circuit.

Although the invention is illustrated on the drawing for inspection of cartons filled with bottles cap down in the carton, the invention is intended to encompass the arrangement wherein the bottles are conveyed upright with caps up. In this latter case, the transducer coils are to be supported in overlying relationship to the passing cartons.

Modifications may be resorted to within the spirit and scope of my invention as defined in the appended claims.

I claim:

1. Apparatus for inspecting cartons with containers packaged therein, each carton adapted to hold a prescribed number of containers with the containers occupying prescribed positions within the carton, said containers normally having metal closure caps applied thereto, the apparatus including a conveyor by which the cartons are carried in succession to and through a testing station, detecting devices positioned at said station and arranged in order and positions corresponding to the said arrangement of the containers within the carton, each detecting device comprising a differential transformer including primary coils connected in opposing phases and a secondary coil, amplifiers and relays individual to the transformers, each relay comprising a solenoid, the relays each comprising a contact element movable to a circuit closing position when the relay is energized, the contact elements being connected in series in a relay circuit, the said closure caps being operable, when brought within the magnetic fields of the corresponding transformers as a carton enters the testing station, to produce voltage in the transformer secondary circuits by which the corresponding amplifiers and relay solenoids are energized, whereby the said relay circuit is established when the carton at the testing station contains the prescribed number of containers and closure caps in the prescribed order, a stop gate movable into and out of the path of the cartons, a gate solenoid operatively connected to said gate and operative while energized to hold the gate out of the path of the cartons, a power circuit in which the gate solenoid is connected, a normally closed switch, a normally open switch, said switches being connected in parallel in the gate solenoid circuit and in parallel with the said relay circuit, the normally closed switch being in the path of the cartons and in position to be opened by a carton after the carton reaches the position to effect the closing of said relay circuit, the normally open switch being positioned and arranged to be closed by the carton while the said relay circuit is closed, the normally open switch being held in closed position while the normally closed switch is released by the carton and again closed, whereby the carton is permitted to advance uninterruptedly through the testing zone when the prescribed number of containers with closure caps thereon are in position within the carton, and whereby the gate solenoid circuit is broken and the gate moved to stop position when a container or closure cap is missing.

2. The combination set forth in claim 1, including a power circuit relay comprising a solenoid in said power circuit and contact bars moved thereby to circuit closing positions when the solenoid is energized, one of said contact bars being in the gate solenoid circuit, and the other contact bar being in circuit with the solenoid of said power circuit relay and in series with said parallel circuits.

3. The apparatus defined in claim 1, including signal devices individual to the said detecting devices and operable by voltage supplied through said amplifiers to indicate the presence of the containers within a carton.

4. Apparatus for inspecting cartons with containers packaged therein, each carton adapted to hold a prescribed number of containers with the containers occupying prescribed positions within the carton, said containers normally having metal closure caps applied thereto, the apparatus including a conveyor by which the cartons are carried in succession to and through a testing station, detecting devices positioned at said station and arranged in order and positions corresponding to the said arrangement of the containers within the carton, each detecting device comprising a differential transformer including primary coils connected in opposing phases and a secondary coil, amplifiers and relays individual to the transformers, each relay comprising a solenoid, the relays each comprising a contact element movable to a circuit closing position when the relay is energized, the contact elements being connected in series in a relay circuit, the said closure caps being operable, when brought within the magnetic fields of the corresponding transformers as a carton enters the testing station, to produce voltage in the transformer secondary circuits by which the corresponding amplifiers and relay solenoids are energized, whereby the said relay circuit is established when the carton at the testing station contains the prescribed number of containers and closure caps in the prescribed order, a stop device for arresting the carton, and electroresponsive means operative by power supplied through said relay circuit to effect the operation of said stop device.

5. Apparatus for inspecting cartons with containers therein arranged in a prescribed order, the apparatus comprising a conveyor by which the cartons are carried in succession to and through a testing station, detecting devices mounted at said station in a prescribed order corresponding to the prescribed arrangement of the containers within the carton, said detecting devices each comprising a differential transformer, said articles being brought into the magnetic fields of the transformers as a carton is brought to the testing station, electroresponsive devices individual to said transformers and each operable by a voltage applied thereto when the corresponding container within a carton is brought within the magnetic field of the transformer, and means controlled by said electroresponsive devices for arresting the cartons.

6. The combination set forth in claim 5, said arresting means including a stop gate movable into and out of the path of the carton, and means controlled by said electroresponsive devices for effecting the operation of said stop gate and moving it into the path of the containers.

7. Apparatus for inspecting cartons with containers packaged therein, each carton normally having a prescribed number of said containers therein in a prescribed position, each container having a metal closure cap, said apparatus including a conveyor by which the cartons are advanced in succession to and through a testing station, detecting devices mounted at said station and arranged in an order corresponding to the positioning of the containers within the carton, each said detecting device comprising a differential transformer, the transformers being so positioned and arranged that each closure cap is brought into the magnetic field of the corresponding transformer when the carton enters the testing station, a signaling device for each detecting device and arranged in corresponding order, means for arresting the cartons, and electroresponsive means actuated by a voltage produced by the entry of a closure cap into the magnetic field of the corresponding transformer to effect the operation of the signaling devices and control the operation of the last-mentioned means by the presence of metal closure caps corresponding to the prescribed number of containers in their prescribed positions in each carton.

8. Apparatus for inspecting cartons with containers packaged therein, each container normally having a prescribed number of said containers therein in a prescribed position, each container having a metal closure cap, said apparatus including a conveyor by which the cartons are advanced in succession to and through a testing station, detecting devices mounted at said station and arranged in an order corresponding to the positioning of the containers within the carton, each said detecting device comprising a differential transformer, the transformers being so positioned and arranged that each closure cap is brought into the magnetic field of the corresponding transformer when the carton enters the testing station, a stop gate, and electroresponsive means controlled by voltage from said transformers for holding the stop gate in inoperative position and for moving the stop gate into the path of a carton when a container or closure cap for the container is missing from the carton.

9. The combination set forth in claim 7, the containers within the carton being placed upside down with their metal closure caps close to the bottom of the carton, the said transformers being positioned below the path of the cartons, each transformer comprising an iron core extending into close proximity to the path of the corresponding closure caps.

10. Apparatus for inspecting cartons with containers packaged therein, each container designed to hold a prescribed number of containers arranged therein in a prescribed order, said apparatus including conveyor mechanism by which the cartons are carried in succession to and through a testing station, a plurality of detecting devices mounted at said station and arranged in an order corresponding to the prescribed order of positioning of the containers within the carton, a stop gate movable into the path of the cartons, a gate solenoid operable when energized to hold the stop gate in its retracted position, a normally closed switch in circuit with said solenoid and movable to open position by each carton as the latter is moving into the testing zone, means operated by said detecting devices when a carton is brought to the testing station to establish a circuit in parallel with the circuit of the normally closed switch before the latter is opened by the carton and thereby maintain the circuit for the gate solenoid, a normally open switch in the path of the carton and positioned to be closed by the carton as the latter moves through the testing station, the normally open switch being closed in time to maintain the circuit for the gate solenoid, the normally open switch being held closed by the carton until the normally closed switch had been released and moved to closed position, whereby the gate solenoid remains energized and the stop gate in retracted position throughout the test when the carton contains the prescribed number of containers.

11. Apparatus for inspecting cartons with a prescribed normal number of containers placed within each carton in a prescribed arrangement and for indicating the presence or absence of a container, said apparatus including a conveyor by which the cartons are carried through a testing zone, detecting devices positioned within said zone and arranged in an order corresponding to the said arrangement of the containers within a carton, each detecting device comprising a differential transformer including primary coils connected in opposite phase and a secondary winding, the said containers being brought respectively into the magnetic fields of the transformers when in said testing zone, relays individual to said transformers, each relay comprising a solenoid, means for energizing each relay solenoid when a voltage is produced in the secondary circuit of the associated transformer by the presence of the container within said magnetic field, electro-responsive signal means controlled by said relays, a stop movable into and out of the path of the cartons, and electro-responsive means for actuating the stop, said electro-responsive means having circuit connections with the said relays by which operation of the relays controls the operation of said stop.

12. The combination of a carrier for a plurality of articles, wherein a prescribed normal number of said articles are placed within the carrier in a prescribed arrangement, each said article normally having metallic components affixed thereon, a conveyor by which the carrier is advanced to and through a testing station, a plurality of detectors at said station and arranged in order and positions corresponding to the said arrangement of the articles within the carrier, each detector including a differential transformer, electro-responsive devices individual to said transformers and each operable by a voltage applied thereto when the corresponding article in the carrier is brought within the magnetic field of the transformer, the presence of said metallic component of the article actuating said electro-responsive devices individually, and means controlled by the electro-responsive devices for arresting the carrier, said means being operated in arresting the carrier whenever said individual electro-responsive devices fail to operate collectively by reason of the prescribed number of articles and their metallic components in the prescribed order being present at the testing station in the carrier.

References Cited in the file of this patent

UNITED STATES PATENTS

| | | |
|---|---|---|
| 1,667,420 | Kent | Apr. 24, 1928 |
| 2,237,254 | Broekhuysen | Apr. 1, 1941 |
| 2,620,923 | Williams | Dec. 9, 1952 |
| 2,636,602 | Stoate | Apr. 28, 1953 |
| 2,774,060 | Thompson | Dec. 11, 1956 |
| 2,791,730 | Stout | May 7, 1957 |
| 2,803,341 | Schneider | Aug. 20, 1957 |

FOREIGN PATENTS

| | | |
|---|---|---|
| 160,291 | Swedish | Aug. 27, 1957 |

OTHER REFERENCES

"Electronic Metal Detector," by Greenmyer, pages 9–10 and 13, in "Electronic Industries and Electronic Instrumentation," November 1947, copy in class 324, sub. class 41.